UNITED STATES PATENT OFFICE.

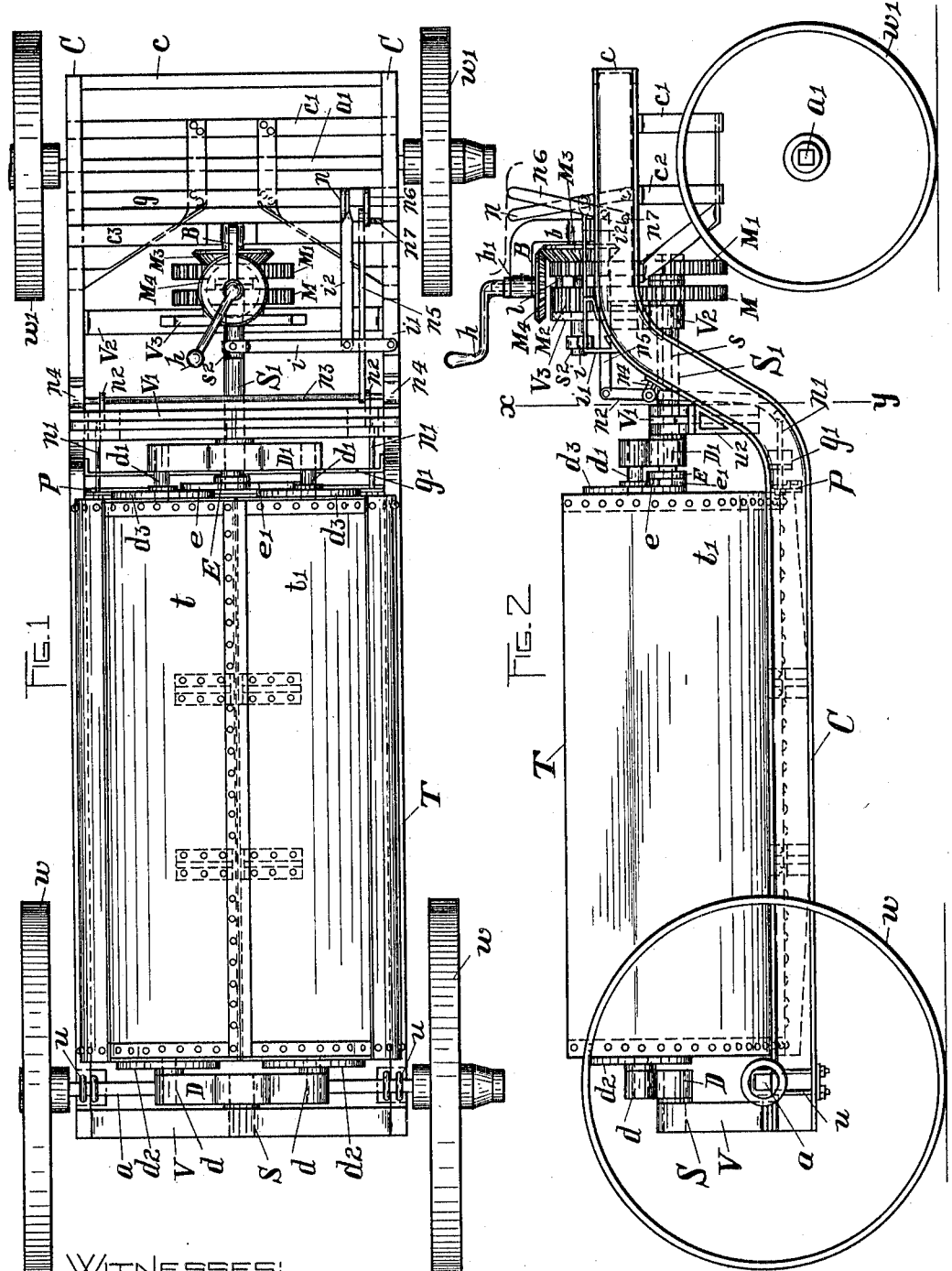

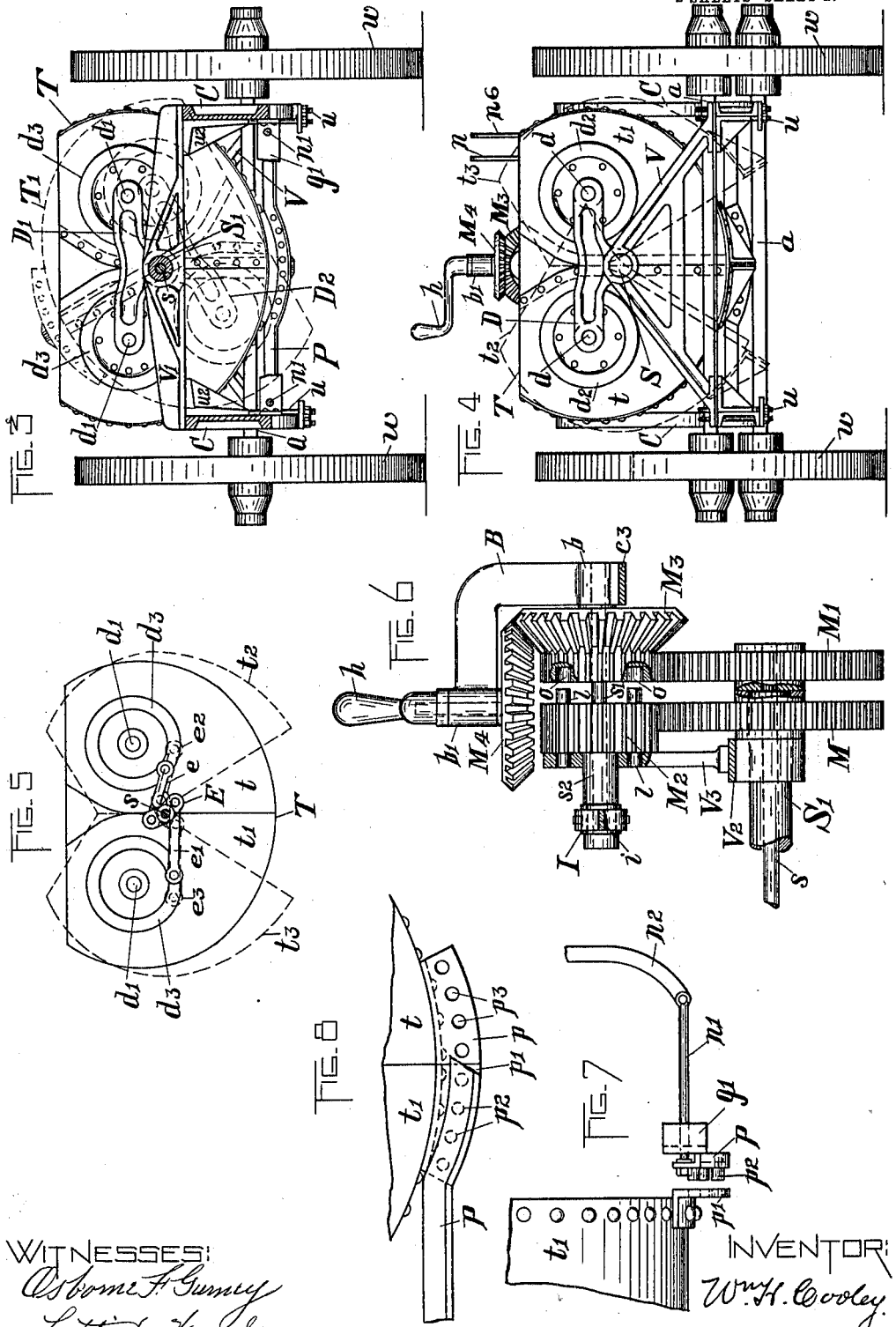

WILLIAM H. COOLEY, OF BROCKPORT, NEW YORK; AUGUSTA H. COOLEY ADMINISTRATRIX OF SAID WILLIAM H. COOLEY, DECEASED.

DUMP WAGON OR CAR.

1,099,341.   Specification of Letters Patent.   Patented June 9, 1914.

Application filed May 11, 1908. Serial No. 432,076.

*To all whom it may concern:*

Be it known that I, WILLIAM H. COOLEY, a citizen of the United States, and a resident of Brockport, in the county of Monroe and State of New York, have invented a new and Improved Dump Wagon or Car, of which the following is a specification.

This invention relates to wagons or cars of that class from which a load may be emptied or dumped by the operation of a suitable lever or handle.

The object of my present invention is to provide a wagon or car of the character described from which the load may be dumped in a pile extending longitudinally and approximately in the center between the wheel tracks or either side of such center, as desired.

My invention comprises, broadly, a longitudinally disposed tank or wagon body with means for effecting a longitudinally extending opening in the center of such body, whereby a load may be dumped in a pile extending longitudinally and approximately in the center between the wheel tracks, and consists also in providing means for swinging, preferably, the closed body of the wagon upon a longitudinally extending axis whereby the entire load may be dumped from either side of the wagon as desired.

In carrying out my invention, I may preferably provide two substantially similar body sections, each pivoted upon an axis of rotation of oscillation extending longitudinally of the wagon or car, and I prefer that such sections be so pivoted as to be practically balanced on such axis when loaded, but with a tendency on the part of such sections to close when empty. These sections are pivotally supported at each end in an arm which in turn is also pivotally supported in such a way that when the sections are closed and held closed, the entire tank or box formed thereby may be turned upon the pivotal supports for such arms so as to dump the entire load from either side of the body. Means are also provided whereby the sections may be locked together in their closed position and tilted out of level either way to facilitate loading the wagon from either side. A lock is also provided for holding the parts in such tilted position.

The accompanying drawings show only such parts of a dump wagon as are essential to illustrate my invention as embodied therein. Such drawings are as follows:—

Figure 1 is a top or plan view of the wagon and Fig. 2 is a side view. Fig. 3 is a sectional view taken along the line $x$—$y$ of Fig. 2 with all parts to the right of such line removed. Fig. 4 is a view of the wagon from the rear end. Fig. 5 shows a front end view of the quadrantal sections with their operating connections. Fig. 6 is an enlarged detail view of the operating gear. Fig. 7 shows in side view the means for locking the sections together and holding them at any desired angle. Fig. 8 is an end view of a part of the locking mechanism seen in Fig. 7.

Similar letters refer to similar parts throughout the several views.

Referring to the drawings,—$a$ and $a^1$ are the rear and front axles of the wagon and $w$ and $w^1$ the rear and front wheels, respectively, thereon. The main frame of my wagon comprises two channel beams C supported at their rear ends from the rear axle $a$ by means of the strap bolts $u$ engaging around the axle and extending through the channel beams, as clearly indicated in Figs. 1, 2, 3 and 4. These channel beams C are curved upwardly just forward of the body T of the wagon and are thence again extended in a horizontal direction and are connected at the front end by a suitable cross piece $c$ and they are also connected on their under side at the front end by suitable bracing and supporting members $c^1$ and $c^2$ which comprise means for supporting such channel beams from the usual fifth wheel resting on and connected to the front axle. The construction of such fifth wheel and its connections, forming no part of my present invention, is not shown herein. A triangular shaped bracket V is supported from the rear end of the channel beams C just behind the rear axle $a$, and projecting forwardly from the upper end of this bracket V is seen a stud S, upon which there is pivotally supported the arm D, as indicated in Figs. 1, 2 and 4. On the inside of each of the channel beams C and just at the foot of the curve therein is secured a bracket $u^2$, such brackets comprising supports for the webbed cross bar $V^1$ in which there is rotatably supported the shaft $S^1$, such shaft being rigidly secured in the arm $D^1$ to support the front end of the body T of the wagon.

In the outer ends of the arms D and D¹ are formed bearings for the trunnions $d$ and $d^1$, respectively, supporting the sections $t$ and $t^1$, comprising the body of the wagon T, at their rear and front ends. The sections $t$ and $t^1$ of the tank have their ends conformed at their upper and inner corners, as indicated in Figs. 3, 4 and 5, to permit the swinging of such members $t$ and $t^1$ on their independent pivotal supports to the positions indicated in Fig. 5, and as such a conformation of the ends would leave an opening at each end near the center of the body there is secured to one of such body members a yoke plate adapted to cover this opening, such yoke plate conformed at its upper end to comprise substantially a continuation of the upper edges of the ends of the tank when in closed position; such yoke member is omitted from Fig. 1 in order to avoid confusion in bringing out more clearly the flanged up construction of the body sections but is clearly shown in Figs. 3 and 4 and diagrammatically in Fig. 5. These trunnions $d$ and $d^1$ are preferably formed integrally with disks $d^2$ and $d^3$ which in turn are secured to the rear and front ends of the sections $t$ and $t^1$ of the body of the wagon. The shaft S¹ has a second bearing formed in the downward projection on the member V² secured between the channel beams C approximately at the top of the curved portions thereof.

The shaft S¹ has on its outer or forward end a gear M. This shaft S¹ is hollow and revolubly supported therein is seen a smaller shaft $s$, on the inner or rear end of which is secured the double crank E, the upper end of which is connected by a link $e$ with a pin on the disk $d^3$ on the section $t$ of the body of the wagon, while in a similar way the lower end of this double crank E is connected by a link $e^1$ with the stud or pin projecting from the disk $d^3$ on the section $t^1$ of the body of the wagon, as more fully shown in Fig. 5, in which figure also the positions for the connecting links $e$ and $e^1$ are shown, respectively, in dotted lines at $e^2$ and $e^3$, and the correspondingly open positions for the sections $t$ and $t^1$ of the tank or body of the wagon are indicated in dotted lines at $t^2$ and $t^3$,—the same plan of lettering in this respect is noted in Fig. 4 where the tank or body is shown in dotted lines as opened at its center.

On the forward end of the shaft $s$ is secured a gear wheel M¹. The gear wheels M and M¹ mesh, respectively, with spur gears M² and M³, the gear M³ extending into a bevel gear which in turn meshes with an operating bevel gear M⁴ secured on the lower end of a short shaft on the upper end of which is seen the operating crank $h$ and which has its single bearing $b^1$ formed at the upper end of the bracket B. The bracket B is supported from the cross bar $c^3$ extending transversely between and secured to the channel beams C on their upper edges and near their forward ends. A shaft $s^1$ has a bearing $b$ at its forward end in the lower end of the bracket B, while its rear end is freely rotatable within the sleeve $s^2$ carried by the gear M², such sleeve $s^2$ being rotatable within a bearing therefor in the upper end of the arm V³ extending upwardly from the cross arm V². This gear M² and sleeve $s^2$ thereon is longitudinally movable on the shaft $s^1$ and carries clutch pins $l$ adapted to engage in suitable holes $o$ therefor in the adjacent face of the gear M³, whereby when such gear M² is moved to the right, as seen in Fig. 6, or forwardly on the shaft $s^1$, the gears M² and M³ are locked and caused to rotate together. These pins $l$ extend longitudinally through the gear M² and are adapted to enter or engage in suitable holes therefor in the arm V³, whereby such gear M² may be locked against rotation when moved to the position shown in Fig. 6 or to the rear on the shaft $s^1$. For moving this gear M² longitudinally on the shaft $s^1$, a collar I is rotatably fitted on the sleeve and prevented from longitudinal movement thereon and has connected therewith the lever $i$ having its other end pivotally secured to the bracket $i^1$ carried by one of the channel beams C, and pivotally connected with this lever $i$ is seen a connecting link $i^2$, the forward end of which articulates with the operating lever $n$, having its lower end pivotally supported from the cross piece $g$, extending between the channel beams C, whereby, by the operation of this lever $n$, the gear M² may be locked against rotation or locked to rotate with the gear M³. From the construction of the parts just above described it will at once be apparent that, with the gear wheel M² locked against rotation, on turning the crank $h$, the gears M⁴, M³ and M¹ will be operated in a way to open the body of the wagon at its center, causing the sections $t$ and $t^1$ to assume the positions indicated in dotted lines in Figs. 4 and 5 at $t^2$ and $t^3$, thus dumping the load in the center. When, however, by the operation of the lever $n$ the gear M² is moved forward so as to be clutched to and operated with the gear M³, the sections $t$ and $t^1$ are held in their closed positions while the entire body T comprising the sections $t$ and $t^1$ is rotated upon the supporting shafts or trunnions therefor S and S¹ and caused to occupy the position indicated in dotted lines at T¹ in Fig. 3, the arm D¹ being caused to occupy the position indicated in dotted lines at D². The load may be dumped either side of the center, as desired, inasmuch as the body of the wagon T may be turned in either direction to dump it by the operation of the handle $h$ in a corresponding direction.

It is sometimes desirable to tilt the body of the wagon a little out of level to facilitate loading the same. This may be done by locking the gear wheels $M^2$ and $M^3$ together and turning the crank $h$ slightly in the desired direction, and when thus tilted, the body of the wagon may be locked in any desired angular adjustment within a moderate range by means of the locking member P comprising a cross bar having a segmental section at its center with pins $p^2$ secured therein, segmentally arranged and adapted to engage in a correspondingly segmentally arranged series of holes $p^3$ in the segmental extensions $p$ and $p^1$ secured to the under side of the body sections $t$ and $t^1$ at their forward ends. This member P is secured at its ends to the rear ends of the bolts $n^1$ sliding through the cross piece $g^1$ extending between and secured to the channel beams C. The forward ends of these bolts $n^1$ articulate with the lower ends of the levers $n^2$ carried by the shaft $n^3$ rotatably supported in brackets $n^4$, seen on the upper edges of the obliquely disposed portions of the channel beams C, while the right hand one of such levers $n^2$, being the one toward the observer in Fig. 2, is extended upwardly and articulates with the connecting link $n^5$ which in turn articulates at its other end with the lever $n^6$ having its lower end pivotally supported on a stud $n^7$ extending inwardly from the right hand channel beam C. Any suitable locking means, not shown, may be provided for locking the levers $n$ and $n^6$ in either extreme position of their movement.

By the operation of the lever $n^6$, the locking member P may be engaged or disengaged from the segmental plates $p$ and $p^1$, secured on the tank sections $t$ and $t^1$, and the tank T may be angularly adjusted by the operation of the crank $h$, in the manner already described, whereby the tank may be locked at an inclination for purposes of loading, and in carrying the load it is preferable usually to force the locking member P in engagement with the plates $p$ and $p^1$ with the body of the wagon in its normal level position, as this helps to take the strain off from the operating gear, although the parts are so balanced that there is very little strain upon the gear and the locking mechanism connected therewith.

From the foregoing description of my invention and the operation of the several parts thereof, it is believed that the use and operation of my dump wagon or car is sufficiently clear to call for no further explanation herein. I may add, however, that the load may be dumped at the bottom by opening the bottom of the tank after first tilting the tank one way or the other and in this way the load may be dumped some little distance either side of the center, as desired. Attention may also be called to the fact that the tank sections $t$ and $t^1$ may be held in their open position when desired by first disengaging the gears $M^2$ and $M^3$ from each other, then opening the sections $t$ and $t^1$ of the tank and then locking the gears $M^2$ and $M^3$ together.

I desire to call attention to the fact that the essential features of my invention consist in the tank or body having members adapted to move relatively to and from each other to open the tank or body at the bottom and such tank or body also pivoted to swing or turn upon a substantially fixed axis of rotation and I do not, therefore, limit myself to any specific character or conformation of the parts or of the supports for the parts or means for operating them.

What I claim is:—

1. In a wagon or car for the purpose described, two tank or body sections pivotally supported at each end in an arm, such arms pivotally supported with their axes in substantial alinement, one of such arms carried by a rotatably supported hollow shaft; a crank on each section, connected by a link to an operating crank, such operating crank carried by a second shaft rotatably supported parallel with the axis of rotation of such sections and within such first shaft and means for rotating such second shaft either independently of such first shaft or together therewith as desired.

2. In a wagon or car for the purpose described, a tank or body supported by the running gear and frame to turn or swing thereon in either direction to discharge the contents therefrom over correspondingly opposite sides thereof and having two members adapted to close and operable to open the tank or body longitudinally of and at its bottom to discharge the contents thereof.

3. In a wagon or car for the purpose described, a tank or body pivotally supported by the running gear and frame to turn or swing thereon in either direction to discharge the contents therefrom over correspondingly opposite sides thereof and having two pivotally supported members adapted to close and operable to open the tank or body longitudinally of and at its bottom to discharge the contents thereof.

4. In a wagon or car for the purpose described, a tank or body supported by the running gear and frame to turn or swing thereon in either direction to discharge the contents therefrom over correspondingly opposite sides thereof and having two members adapted to close and operable to open the tank or body longitudinally of and at its bottom to discharge the contents thereof; means for swinging the tank or body; means for locking the tank or body against angular motion; means for operating said members and locking means for holding said members in closed position.

5. In a wagon or car for the purpose described, a tank or body pivotally supported by the running gear and frame to turn or swing thereon in either direction to discharge the contents therefrom over correspondingly opposite sides thereof and having two pivotally supported members adapted to close and operable to open the tank or body longitudinally of and at its bottom to discharge the contents thereof; means for swinging the tank or body on its pivotal support; means for locking the tank or body against angular motion; means for operating said members and locking means for holding said members in closed position.

WM. H. COOLEY.

Witnesses:
OSBORNE F. GURNEY,
LOTTIE WOOD.